United States Patent [19]
Lewis et al.

[11] Patent Number: 5,959,828
[45] Date of Patent: Sep. 28, 1999

[54] COUPLING WITH INSULATED FLANGES

[75] Inventors: Jeffrey M. Lewis, Laguna Niguel; Stanley R. Field, Anaheim, both of Calif.

[73] Assignee: Hydraflow, Cerritos, Calif.

[21] Appl. No.: 08/877,492

[22] Filed: Jun. 17, 1997

Related U.S. Application Data

[63] Continuation-in-part of application No. 08/680,958, Jul. 16, 1996, Pat. No. 5,786,976, and application No. 08/788,596, Jan. 24, 1997, abandoned.

[51] Int. Cl.$^6$ .................................................. H01R 4/64
[52] U.S. Cl. .......................................... 361/215; 361/212
[58] Field of Search .................................. 361/212, 215; 439/190–192; 174/84 R

[56] References Cited

U.S. PATENT DOCUMENTS

| | | |
|---|---|---|
| 3,383,637 | 5/1968 | De Lano . |
| 3,402,947 | 9/1968 | Lewis . |
| 3,462,727 | 8/1969 | Blight et al. . |
| 3,669,472 | 6/1972 | Nadsady . |
| 3,805,379 | 4/1974 | Vetter . |
| 3,808,580 | 4/1974 | Johnson . |
| 3,891,291 | 6/1975 | Nadsady et al. ........................ 339/15 |
| 3,917,373 | 11/1975 | Peterson . |
| 3,971,614 | 7/1976 | Paoli et al. . |
| 3,999,825 | 12/1976 | Cannon ................................... 339/15 |
| 4,008,937 | 2/1977 | Filippi ..................................... 339/15 |
| 4,019,762 | 4/1977 | Eidelberg et al. . |
| 4,030,798 | 6/1977 | Paoli . |
| 4,035,045 | 7/1977 | Trevithick . |
| 4,074,927 | 2/1978 | Ball . |
| 4,109,097 | 8/1978 | Berry . |
| 4,117,287 | 9/1978 | Walker et al. . |
| 4,165,910 | 8/1979 | Anderson . |
| 4,241,969 | 12/1980 | D'Amato et al. . |
| 4,249,786 | 2/1981 | Mahoff . |
| 4,260,211 | 4/1981 | Mollere . |
| 4,268,103 | 5/1981 | Schildkraut et al. . |
| 4,286,834 | 9/1981 | Goodman et al. . |
| 4,322,451 | 3/1982 | Emerson et al. . |
| 4,332,404 | 6/1982 | Huffman . |
| 4,346,428 | 8/1982 | Gale . |
| 4,359,254 | 11/1982 | Gallusser et al. . |
| 4,361,373 | 11/1982 | Gallusser et al. . |
| 4,405,969 | 9/1983 | Swavely . |
| 4,435,760 | 3/1984 | Kuno et al. . |
| 4,443,052 | 4/1984 | Eaby et al. . |
| 4,461,526 | 7/1984 | Gallusser et al. . |
| 4,462,653 | 7/1984 | Flederbach et al. . |
| 4,472,013 | 9/1984 | Frear . |
| 4,487,462 | 12/1984 | Gale et al. . |
| 4,506,942 | 3/1985 | Flederbach et al. . |
| 4,525,017 | 6/1985 | Schildkraut et al. . |

(List continued on next page.)

OTHER PUBLICATIONS

Engineering Bulletin—"Boron Electroless Nickel vs. Hard Chrome," Anodyne™, Inc., May 1992.

*Primary Examiner*—Fritz Fleming
*Attorney, Agent, or Firm*—David M. Klein; Shearman & Sterling

[57] ABSTRACT

A coupling for preventing the buildup of static electricity between adjacent conduits includes a sleeve enclosed by pivotally connected semicircular segments. The semicircular segments are in electrical contact with first and second conduits via bonding wires. The semicircular segments, bonding wires, and/or flanges are coated with a hard metallic ductile conductive coating, which is preferably a boron-nickel coating, to provide electrical conductivity between the conduits. The coupling may be entirely coated with the boron-nickel coating, or selectively coated to provide the required electrical conductivity between the conduits. The conduits include flanges mounted on the ends thereof. Each flange is selectively coated with a hard anodized, dry-lube, thin-film non-conductive, or other insulating coating to reduce or prevent arcing on the interior of the coupling under lighting strike or other hazardous electrical conditions.

32 Claims, 6 Drawing Sheets

U.S. PATENT DOCUMENTS

| | | |
|---|---|---|
| 4,542,952 | 9/1985 | Tomsa . |
| 4,544,224 | 10/1985 | Goodman et al. . |
| 4,591,226 | 5/1986 | Hargett et al. . |
| 4,597,621 | 7/1986 | Burns . |
| 4,603,934 | 8/1986 | Burns . |
| 4,613,192 | 9/1986 | Peterson . |
| 4,616,894 | 10/1986 | Baker . |
| 4,629,272 | 12/1986 | Mattingly et al. . |
| 4,633,363 | 12/1986 | Bordner . |
| 4,639,064 | 1/1987 | Knapp et al. . |
| 4,648,670 | 3/1987 | Punako et al. . |
| 4,658,326 | 4/1987 | Clark et al. . |
| 4,690,212 | 9/1987 | Termohlen . |
| 4,697,608 | 10/1987 | Kolze et al. . |
| 4,703,988 | 11/1987 | Raux et al. . |
| 4,726,782 | 2/1988 | Hager et al. . |
| 4,741,706 | 5/1988 | Takeda et al. . |
| 4,808,117 | 2/1989 | Gale et al. . |
| 4,820,185 | 4/1989 | Moulin . |
| 4,833,041 | 5/1989 | McComas ............................. 428/610 |
| 4,863,328 | 9/1989 | Malek . |
| 4,900,260 | 2/1990 | Drogo . |
| 4,902,238 | 2/1990 | Iacobucci . |
| 4,913,657 | 4/1990 | Naito et al. . |
| 4,928,202 | 5/1990 | Gale et al. . |
| 5,022,864 | 6/1991 | Ali . |
| 5,035,640 | 7/1991 | Drogo . |
| 5,046,964 | 9/1991 | Welsh et al. . |
| 5,082,454 | 1/1992 | Tonkiss et al. . |
| 5,083,930 | 1/1992 | Barron . |
| 5,145,394 | 9/1992 | Hager . |
| 5,166,475 | 11/1992 | Ackerman et al. . |
| 5,181,860 | 1/1993 | Homma et al. . |
| 5,192,219 | 3/1993 | Fowler et al. . |
| 5,213,907 | 5/1993 | Caballero ............................. 428/678 |
| 5,222,770 | 6/1993 | Helevirta . |
| 5,225,632 | 7/1993 | Gorin et al. . |
| 5,246,379 | 9/1993 | Wright . |
| 5,295,848 | 3/1994 | Mohn . |
| 5,322,451 | 6/1994 | Guss, III et al. . |
| 5,328,387 | 7/1994 | Hoffman . |
| 5,334,801 | 8/1994 | Mohn . |
| 5,366,383 | 11/1994 | Dearman . |
| 5,382,359 | 1/1995 | Brandt . |
| 5,399,096 | 3/1995 | Quillet et al. . |
| 5,430,603 | 7/1995 | Albino et al. . |
| 5,435,760 | 7/1995 | Miklos . |
| 5,447,447 | 9/1995 | Guss, III et al. . |
| 5,480,311 | 1/1996 | Luu . |
| 5,483,412 | 1/1996 | Albino et al. . |
| 5,490,789 | 2/1996 | Simons . |
| 5,496,189 | 3/1996 | Over et al. . |
| 5,505,632 | 4/1996 | Hayashi et al. . |
| 5,522,770 | 6/1996 | Sugiki et al. . |

COUPLING WITH INSULATED FLANGES

CROSS-REFERENCE TO RELATED APPLICATIONS

This is a continuation-in-part of U.S. patent application Ser. No. 08/680,958, filed Jul. 16, 1996 now U.S. Pat. No. 5,786,976, and of U.S. patent application Ser. No. 08/788,596, filed Jan. 24, 1997, now abandoned, the contents of which are incorporated herein by reference.

BACKGROUND OF THE INVENTION

1. Field of the Invention.

The present invention relates generally to a coupling assembly for fuel lines and the like, and more particularly to a coupling assembly for interconnecting adjacent conduits in which the coupling assembly is coated with a hard metallic ductile conductive coating for preventing the buildup of an electrostatic charge between the conduits, and wherein the flange to which the coupling is mounted is selectively coated with a hard anodized coating or other non-electrically conductive coating to improve the lighting-strike characteristics of the coupling by preventing arcing between the flanges and between each flange and the coupling.

2. Description of the Related Art.

When conveying fluid, such as jet fuel, between interconnected fuel lines, it is necessary to provide electrical conductivity between the fuel lines to prevent the buildup of an electrostatic charge between the fuel lines. If an electrostatic charge were to build up, an electric spark could occur, thereby causing the fuel to ignite. The build up of static electricity poses a problem in other applications which use conduits for material transfer. For example, in sandblasters, if the hose used to discharge the sand is not grounded, static electricity may build up sufficiently in the hose so that an electric shock and/or arcing may occur at the coupling between hose lengths, causing personal injury or property damage. This situation is discussed in more detail in U.S. Pat. No. 4,658,326.

In order to overcome the problem of static buildup in fuel lines, U.S. Pat. No. 4,487,462, the contents of which are incorporated herein by reference, discloses a coupling that provides electrical contact between adjacent fuel lines. A pair of bonding jumpers is provided each of which includes i) an annular ring having a plurality of bonding jumper contact flanges that engage a surface of the threaded coupling, and ii) a plurality of spaced retaining tangs which snap into a retaining groove in the coupler and the nut. The nut also includes a plurality of circumferentially spaced contact tangs which are interspersed with the retaining tangs and which contact the outer end of the coupling beyond the threads.

Another requirement for aircraft fuel lines, which is not necessarily a requirement for couplings used in other applications, is that the coupling be self-retained after installation in such a manner that the coupling will not loosen despite vibrations or other forces to which the coupling may be subjected. U.S. Pat. No. 3,669,472, the contents of which are incorporated herein by reference, discloses one of many patented devices that have been developed to prevent relative rotation of coupling members. This device relates to a coupling having an annular ring with spring fingers which releasably engage notches on the edge of a male connector to minimize the chance of the coupling becoming unthreaded due to vibrations or other forces on the coupling. A separate releasable bonding ring is provided between the two coupling elements.

A related aspect of the coupling of fuel lines to reduce the buildup of static electricity is the contact between the coupling members and the fuel lines. This point of contact is preferably redundant so as to reduce the likelihood that the contact will fail, and must be capable of being rotated with the coupling members as they are threaded together. One method for providing such contact was developed by the Assignee of the present invention and sold as the 15J02 and 15J Series couplings. The 15J02 and 15J Series couplings are constructed of male and female threaded coupling members and a detent ring with a single resilient detent mounted to one of the coupling members. The other coupling member includes a surface facing the detent ring with spaced notches for engaging with the detent as the coupling members are rotated relative to each other. In order to provide electrical contact between the coupling members and the fuel lines, a split ring with a multi-sided bonding wire mounted therein is mounted in each end of one coupling member. The bonding wires provide multiple electrical contact points between the fuel lines and coupling members.

Figure 1:
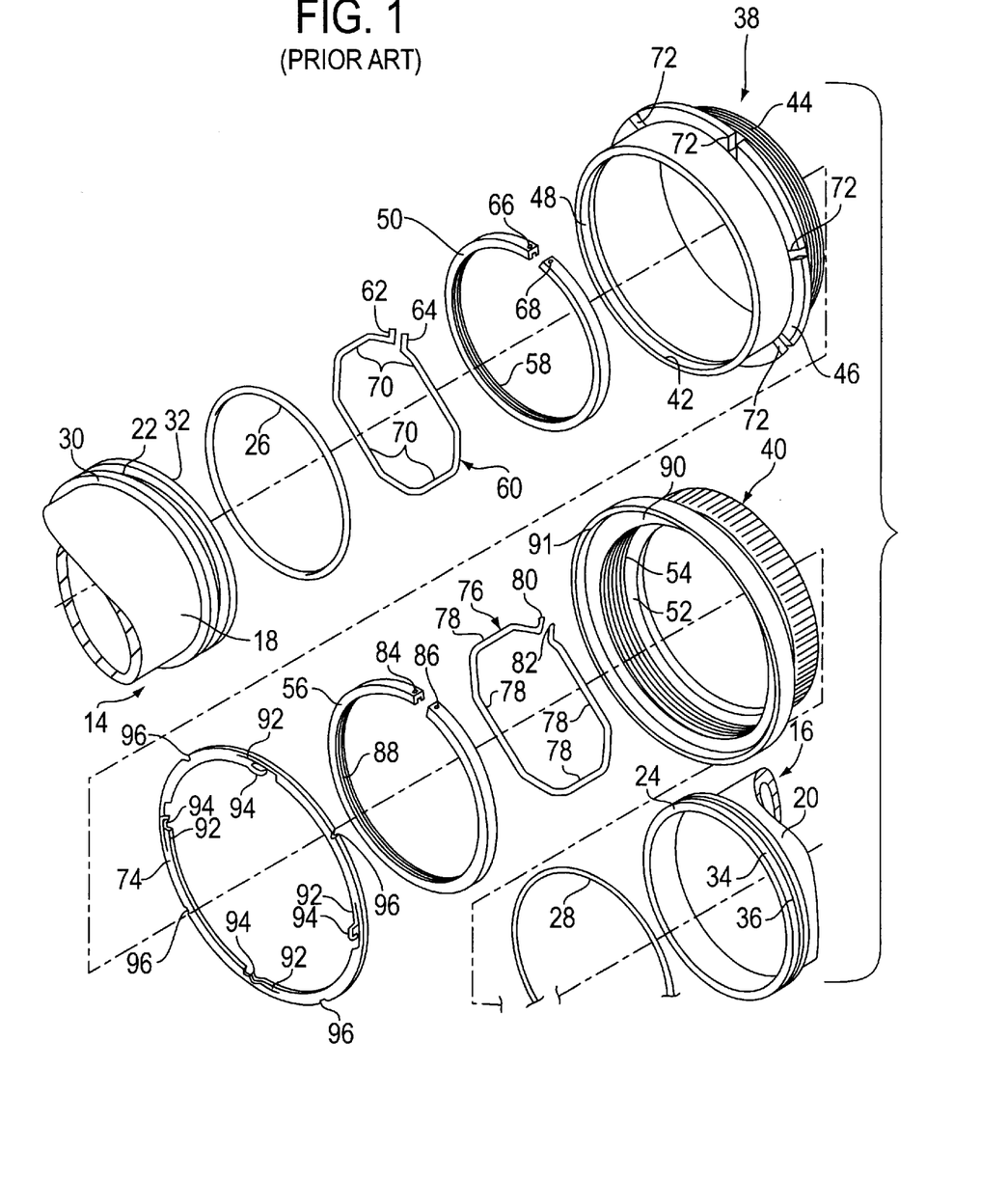
FIG. 1 is an exploded perspective view of a prior art fuel coupling of the type disclosed in U.S. Pat. Nos. 4,808,117 and 4,928,202.

As shown in FIG. 1, U.S. Pat. Nos. 4,808,117 and 4,928,202, the contents of which are incorporated herein by reference, relate to a threaded coupling that is essentially a combination of the teachings of the aforementioned U.S. Pat. Nos. 3,669,472 and 4,487,462, and the 15J02 Series couplings. A pair of assembly sealing flanges 14 and 16 are connected to the ends of fuel lines (not shown). The flanges each have a cylindrical skirt 18 and 20 which is sealingly attached to the fuel lines by any suitable means. Each flange is provided with a peripheral recess 22 and 24 for receiving O-rings 26 and 28. Recess 22 is formed between a pair of peripheral ribs 30 and 32 and recess 24 is formed between a pair of similar ribs 34 and 36. The confronting ends of the fuel lines are interconnected by means of a threaded coupler 38 and nut 40 which cooperate to draw the coupler and nut axially toward each other to secure them together and to form a fluid-tight seal. Within coupler 38 is a circumferential retaining groove 48 receiving a split ring 50.

The nut or female member 40 has an inwardly projecting peripheral flange 52 on its end and internal threads 54 which receive threads 44 of coupler 38. The peripheral flange 52 serves as a stop for split ring 56, which is mounted in female coupling member 40. Split rings 50 and 56 have internal grooves 58 and 88 within which bonding rings 60 and 76 are received respectively. Bonding rings 60 and 76 have a generally non-circular configuration and have upturned spaced ears 62, 64, 80 and 82 which are squeezed together to insert the bonding rings into grooves 58 and 88, and which project upwardly through apertures 66, 68, 84 and 86. Split rings 50 and 56 serve to retain the coupling members 38 and 40 on sealing flanges 14 and 16. The flat sides 70 and 78 of bonding rings 60 and 76 engage the cylindrical skirts 18 and 20 of sealing flange 14 and 16 to provide multiple electrical contact points between the coupling members 38 and 40 and the sealing flanges. Flange 48 has a plurality of spaced notches 72 which are utilized with a bonding jumper 74.

Nut 40 is provided with a recess 90 within which bonding jumper 74 is received. The bonding jumper has a plurality of equally spaced spring detents 92, each of which has a curved end 94. The bonding jumper is also provided with spaced notches 96 into which the edge 91 is bent to form a crimp to prevent relative rotation of bonding jumper 74 with respect to nut 40. As nut 40 is tightened, the curved ends of spring detents 92 come into engagement with flange 46 of coupler 38 and engage notches 72. As the nut is drawn tight, the force of each spring detent against flange 46 and notches 72 increases. This arrangement provides a redundant electrical contact between nut 40 and coupling 38. Bonding jumper 74 also serves to minimize the possibility that the nut will turn in a reverse direction accidentally due to vibrations or other forces.

In commercial versions of couplings of the type disclosed in U.S. Pat. Nos. 4,808,117 and 4,928,202, the threads of the coupling members are coated with a non-electrically-conducting dry-lube coating in order to enable the members to be threadably engaged without binding. Thus, the redundant electrical contact provided by bonding jumper 74 is necessary because no electrical contact is provided between the coupling members through the threads.

Accordingly, it would be desirable to have a coupling for preventing electrostatic build up between adjacent conduits in which the electrical contact is provided through the threads so that a bonding jumper is not required for preventing such electrostatic buildup. It would also be desirable to have such a coupling in which there is a low coefficient of friction between the threaded surfaces so as to avoid binding of the threads during threading.

An alternative type of coupling for fuel lines is commonly known as a clamshell coupling. This type of coupling is described in detail in, for example, U.S. Pat. Nos. 4,249,786 and 4,346,428, the contents of each of which are incorporated herein by reference. A clamshell coupling includes two semi-circular segments which are hinged together at one pair of adjacent ends. The other pair of adjacent ends is provided with an interlocking latch so as to latch the two semicircular segments together in a continuous annular closure member. In order to prevent a buildup of static electricity between the adjacent conduits, a pair of bonding wires establishes an electrical connection between the clamshell coupling and each of the conduits.

While this configuration is generally effective at preventing a buildup of static electricity between the conduits, due to the dangerous situation presented by any such buildup, it would be beneficial to have an improved system for preventing the buildup of static electricity between conduits in a clamshell coupling.

Lighting strike characteristics are very important for fuel lines couplings, especially aircraft fuel line couplings. In the event that an aircraft is struck by lighting or experiences a static discharge, the coupling must not arc internally or externally, which might result in ignition of fuel vapors in the fuel line or in the outside environment, i.e., inside a partially filled fuel cell, and possibly a catastrophic failure of the aircraft. Because it is impractical to test fuel lines under actual lighting strike conditions, laboratory tests are performed in which the coupling is struck by simulated lighting. Accordingly, it would be desirable to have a fuel line coupling capable of withstanding such a simulated lighting strike with minimal or no internal or external arcing in order to reduce the possibility of a catastrophic failure due to an actual lighting strike while the coupling is in use.

SUMMARY OF THE INVENTION

The present invention is a coupling for preventing the buildup of static electricity between first and second conduits. In one embodiment of the invention, the coupling comprises first and second coupling members in electrical contact with the first and second conduits respectively. The first and second coupling members each comprise threads and are threadably engageable. The threads are coated with a hard metallic ductile conductive coating, which is corrosion resistant, has a low coefficient of friction and provides electrical conductivity between the coupling members. A preferred hard metallic ductile conductive coating is boron-nickel. The boron-nickel coating has a satisfactory low coefficient of friction so as to prevent binding of the threads during threading.

In the first embodiment, the first coupling member has a first surface, which includes at least one detent notch, facing the second coupling member. A detent spring is rotatable with the second coupling member and faces the first surface. The detent spring includes a detent which engages with the notch to provide a resistance force against relative rotation between the first and second coupling members as the coupling members threadably engage or disengage. The detent spring may be metallic or non-metallic, or coated with a dry-lube or other lubricant. If desired, the first and second coupling members may be entirely coated with the boron-nickel coating, or selectively coated to provide the required electrical conductivity between the coupling members.

In order to provide electrical contact between the coupling members and the conduits, the coupling members are provided with inwardly facing circumferential retaining grooves. In one embodiment of the invention, split rings are mounted in the retaining grooves, with each split ring being in electrical contact with its respective coupling member. Each split ring has an internal groove, with bonding wires mounted within the internal grooves. Each bonding wire is in electrical contact with its respective split ring and with its respective conduit. The bonding wires are preferably multi-sided and make multiple electrical contacts with the conduits.

In an alternative embodiment, the bonding wires are mounted directly in the coupling members, with each bonding wire in electrical contact with its respective coupling member and with its respective conduit. Similarly, the bonding wires are preferably multi-sided and make multiple electrical contacts with the conduits.

In an alternative type of coupling, the coupling is a clamshell type coupling that removably circumferentially engages the conduit members. The coupling comprises a generally circular member having a pair of semicircular segments. The semicircular segments are pivotally connected to join confronting ends of the conduits. The coupling is coated with a hard metallic ductile conductive coating, such as boron nickel, for establishing electrical contact between the first and second conduits. The coupling may also include a sleeve, which itself may be coated with the hard metallic ductile coating, for peripherally surrounding the confronting ends of the conduit. The pivotally joined semicircular segments surround the sleeve and conduit ends for sealing the conduits together.

The clamshell coupling includes a latch assembly for retaining the coupling in a closed position. One embodiment of the latch assembly comprises a first latch pin mounted to the first semicircular segment and a second latch pin mounted to the second semicircular segment. A first latch pawl is pivotally mounted to the first latch pin, with the first latch pawl being engageable with the second latch pin, and a second latch pawl pivotally mounted to the second latch pin and being engageable with the first latch pin. The latch pawls may be spring biased toward engagement with the latch pins. In an alternative embodiment, the latch assembly comprises a single clevis mounted to the first semicircular segment and a clasp mounted to the second semicircular segment, the clasp being engageable with the clevis.

In a more general embodiment, the invention relates to a coupling in which the first and second coupling members are attachable in physical contact for establishing a passage conduit between the conduits. At least a portion of the areas of the coupling members that are in physical contact are coated with a boron-nickel coating for establishing electrical contact between the coupling members.

In order to improve the lighting strike and electrical conduction characteristics of the couplings, the couplings are preferably used in combination with flanges that are selectively coated with a hard metallic ductile coating, such as a boron nickel coating, on a portion thereof for establishing electrical contact, and insulated on the balance the flange with an insulating coating, such as a hard anodize or dry-lube to prevent arcing between the flanges. Other portions of the coupling members may be coated with anodize or other insulating coating to further reduce the likelihood of arcing.

DETAILED DESCRIPTION OF THE INVENTION

FIGS. 2–5 show a first embodiment of the present invention, which comprises an improved threaded coupling 100 for interconnecting the ends of adjacent conduits (not shown). The conduits may be any appropriate pipes, tubes or other conduits for carrying a fluid, such as fuel, or for carrying any other material, such as sand for a sandblaster, or as a conduit for enclosing (e.g. shrouding) fluid conduits, or as a conduit for enclosing (e.g. protecting) electric wires or control cables. It will be appreciated that a function of coupling 100 is to provide electrical conductivity between the adjacent conduits. This is important for preventing electrical arcing or sparks caused by static electricity, lightning strikes or fault currents. The conduits may be constructed entirely of an electrically conducting material, or may include only a shielding or grounding layer constructed of an electrically conducting material. In general, the conduits must be at least partially constructed of an electrically conducting material that is in electrical communication with coupling 100.

An assembly sealing flange 114 is sealingly attached to the end of each conduit by any method known to those skilled in the art provided that each flange 114 is in electrical communication with the electrically conductive portion of its associated conduit. Each flange 114 is provided with a peripheral recess 122 formed between a pair of peripheral ribs 130. An O-ring 126 is seated in each peripheral recess 122 for forming a fluid tight seal when required between flange 114 and coupling 100 as shown in detail in FIG. 5.

Figure 4:
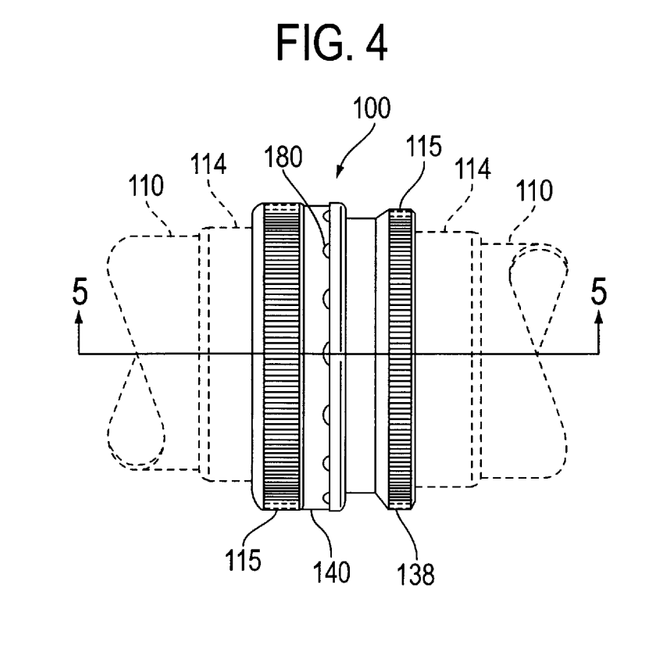
FIG. 4 is a side view of the coupling of the invention.
Figure 5:
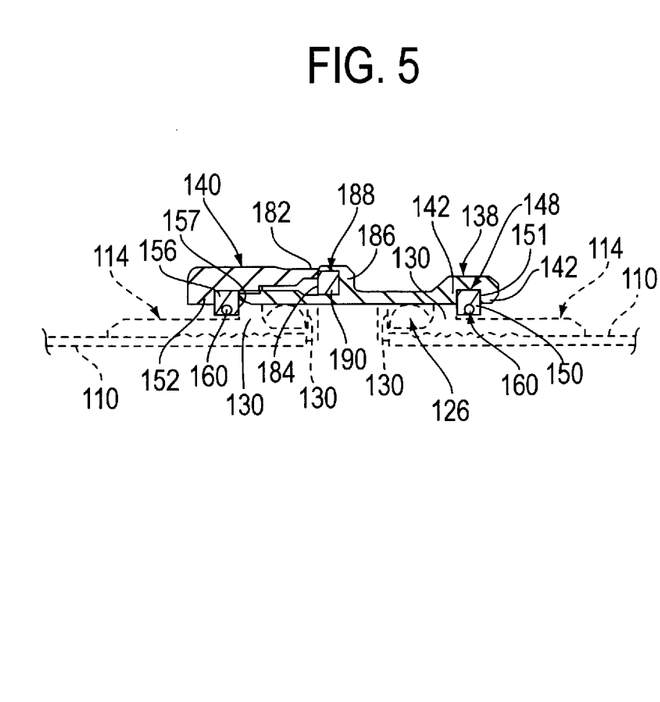
FIG. 5 is a cross-sectional view of the coupling of the invention through Section 5—5 for the embodiment of the invention shown in FIG. 3.

Coupling 100 consists of male and female coupling members 138 and 140 respectively which are threadably interconnected by means of external threads 112 on male coupler 138 and internal threads 113 on female coupler 140. Coupling members 138 and 140 are preferably constructed of aluminum, stainless steel, or titanium, but may be constructed of any other appropriate material, if desired. Grips 115 on the outer surface of the male and female coupling members facilitate rotation of the coupling members. As male coupling member 138 is rotated with respect to female coupling member 140 with threads 112 and 113 in engagement, the coupling members are drawn axially toward each other until a fully threaded position is achieved (FIGS. 4 and 5). Each of the coupling members 138 and 140 is generally cylindrical in shape and is slidable over its respective sealing flange 114.

Figure 2:
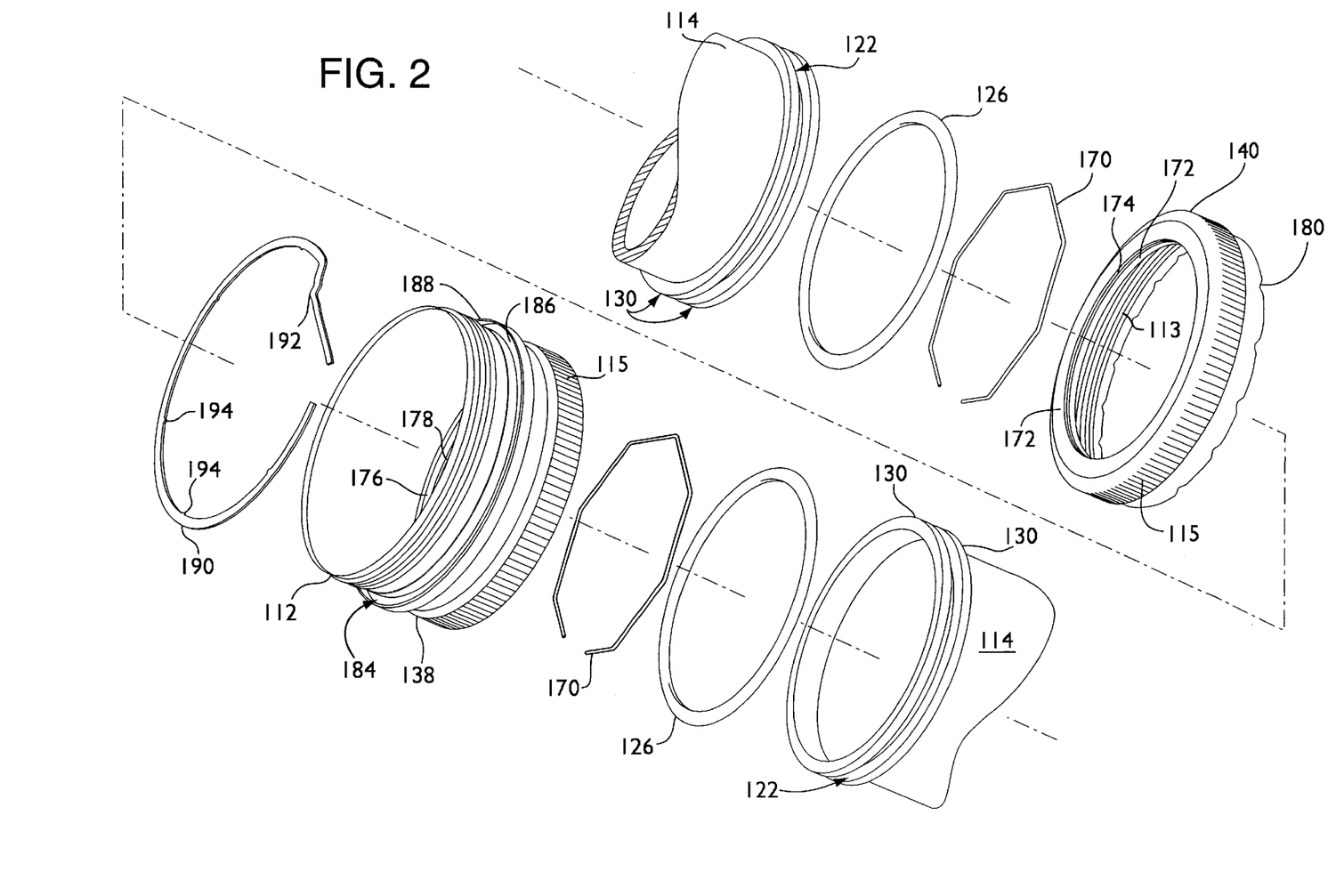
FIG. 2 is an exploded perspective view of the fuel coupling of the invention with the bonding wires mounted directly in grooves on the coupling members.
Figure 3:
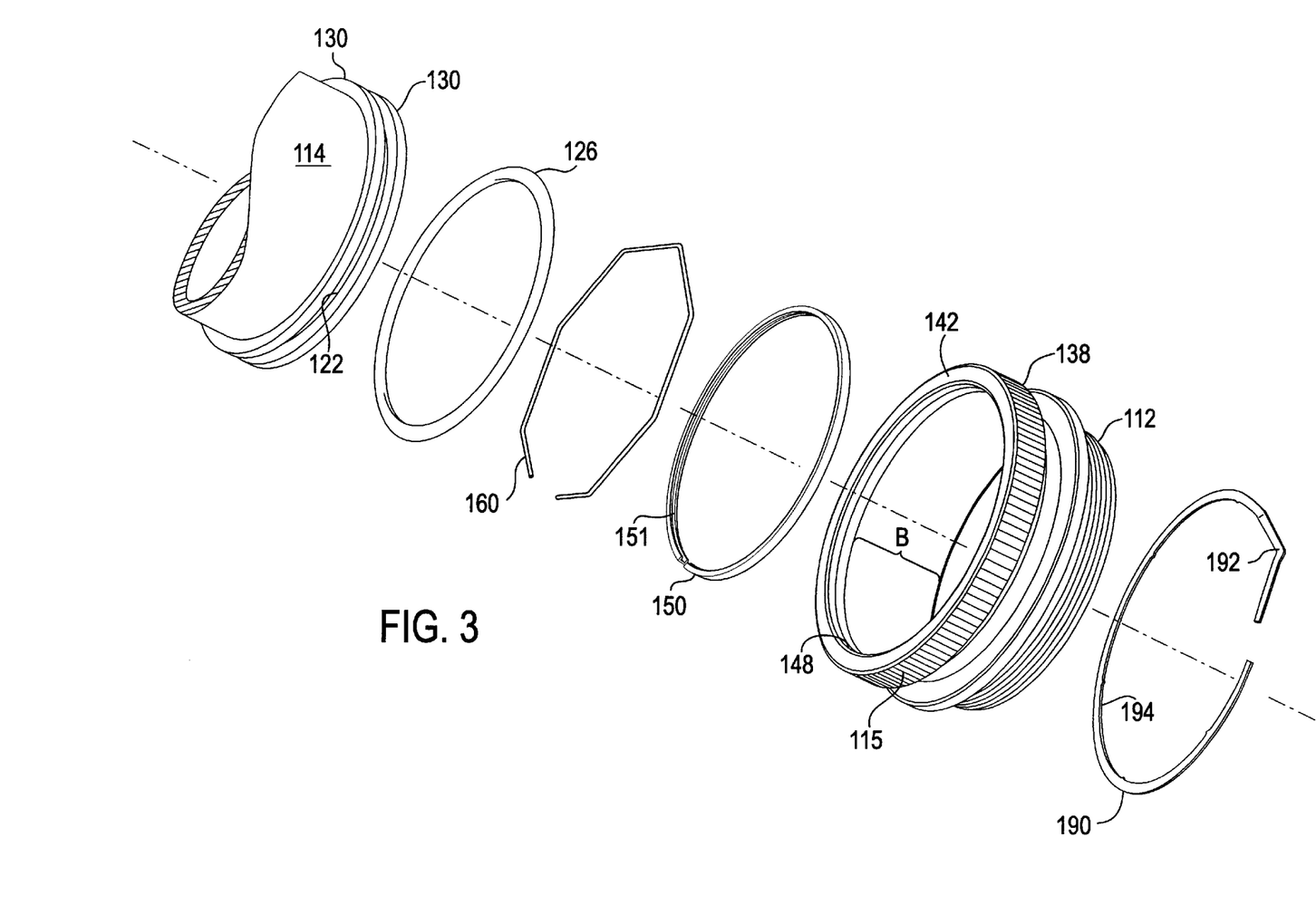
FIG. 3 is an exploded perspective view of the fuel coupling of the invention with the bonding wires mounted in split rings.

FIGS. 3–5 and FIG. 2 show first and second embodiments of the invention respectively with respect to the structure for securing coupling 100 to flanges 114 with the required electrical contact therebetween. Beginning with the first embodiment, as shown in FIGS. 3 and 5, male coupler 138 is provided with inwardly projecting flanges 142 which define a circumferential retaining groove 148. Seated within retaining groove 148 is a split ring 150 which includes a circumferential groove 151. As shown in FIG. 5, female coupling member 140 has an inwardly projecting peripheral flange 152 which serves as a stop for split ring 156. Split ring 156 is seated against the face of flange 152 and includes a circumferential groove 157. Each split ring is preferably constructed of aluminum or any other appropriate electrically conducting material.

Mounted within each circumferential groove 151 and 157 of split rings 150 and 156 is a metallic bonding ring 160. Each bonding ring 160 preferably has a multi-sided polygonal shape and the straight sides engage the outer surfaces of sealing flanges 114 to provide multiple electrical contacts between the coupling 100 and flanges 114. It is foreseen that bonding rings with other shapes, e.g., with fewer or more sides, would provide the requisite electrical contact between coupling 100 and flanges 114. Bonding rings 160 are preferably constructed of tin-coated beryllium copper or any other appropriate electrically conducting material.

As shown in FIG. 2, the second embodiment for securing coupling 100 to flanges 114 is similar to the first embodiment except that split rings 150 and 156 are not used to secure the bonding rings. Instead, female coupling 140 is provided with inwardly projecting flanges 172 which define a circumferential groove 174. Seated within groove 174 is a metallic bonding ring 170 which has an polygonal shape that serves to retain the coupling member 140 in electrical communication with flange 114. As in the first embodiment, male coupler 138 is provided with inwardly projecting flanges 176 which define a circumferential groove 178 in which a metallic bonding ring 170 is mounted. Thus, with respect to male coupler 138, the principal difference between the first and second embodiments of the invention is that the inwardly projecting flange has a smaller inside diameter such that it performs a similar retaining function as the split ring. In the first embodiment, retaining groove 148 is sized to receive split ring 150, whereas in the second embodiment, groove 178 is sized to receive only the narrower bonding wire 170.

Female coupler 140 has a plurality of spaced detent notches 180 formed in a circumferential lip 182. An annular groove 184 is formed on male coupler 138 by outwardly extending flange 186 and circumferential lip 188. Mounted within groove 184 is a detent spring 190. Detent spring 190 has a detent 192 which is formed on a curved end thereof and inwardly extending ears 194. Annular groove 184 is preferably sized such that detent spring 190 must be force pressed therein. When detent spring 190 is pressed into groove 184, ears 194 frictionally engage with male coupling 138 to prevent relative rotation of detent spring 190 with respect to male coupling 138. Those skilled in the art will appreciate that other techniques exist to prevent relative rotation of detent spring 190 with respect to male coupling 138.

As male coupling 138 is tightened, i.e., rotated with respect to female coupling 140, detent 192 will come into engagement with circumferential lip 182 in female coupling 140 and with detent notches 180. As the male and female couplings are drawn tighter, the force of spring detent 192 against detent notches 180 will increase. This arrangement provides a locking mechanism which minimizes the likelihood that the male coupling will accidentally turn in a reverse direction due to vibrations or other forces. The coupling may be disassembled by turning male coupling 138 counterclockwise with sufficient force to overcome the engagement of detent 192 with detent notches 180.

Detent ring 190 is preferably constructed of a metal, such as stainless steel or beryllium copper, or of any other appropriate material with sufficient resiliency and strength to perform the functions described herein. As discussed in detail below, unlike in prior art devices, the detent spring is not required to provide an electrical path between the male and female coupling members. Accordingly, a non-metallic detent spring may be used, if desired. In a preferred embodiment, detent spring 190 is coated with a dry-lube coating of the type defined in Military Specification MIL-L-46010 Type 1. It will be appreciated that the lubricant or anti-wear coating is optional and that other types of lubricants or anti-wear coatings may be used in lieu of the dry-lube. Also, the detent spring may be eliminated if the prevention of unthreading of the coupling members is not critical or if an alternative approach is used to prevent such unthreading.

In order to ensure electrical continuity between male and female coupling members 138 and 140, threads 112 and 113 are coated with a boron electroless nickel ("boron nickel") coating. The boron nickel coating also provides a relatively low co-efficient of friction between the male and female coupling members, thereby preventing binding of threads 112 and 113 during mating of the coupling members and also obviating the need for a dry-lube coating on the threads. Without the dry-lube coating, strong electrical contact is provided between the threads of the male and female coupling members. Thus, with the coupling of the invention (in the embodiment shown in FIG. 2), an electrical path is provided from flange 114, through bonding wire 170 to female coupling member 140, from threads 113 to threads 112 and male coupling member 138, and through bonding wire 170 to flange 1 14. A similar electrical path is provided in the embodiment shown in FIGS. 3–5, with the additional path through the split rings. No electrical path is required through detent spring 190, thereby enabling detent spring 190 to be dry-lube coated or constructed of a non-metallic material. In a preferred embodiment, the boron nickel is coated to a thickness of 0.0003"+/−0.0001". It is foreseen that the thickness of the boron nickel coating may vary as desired, provided that the dimensions of the coupling are such to allow the male and female coupling members to be threadably engaged. Furthermore, it will be appreciated that while it is only necessary that the threads of the coupling members be coated with the boron nickel coating, it is foreseen that any other portion of the coupling members, or the entirety of the coupling members may be coated with the boron nickel coating, which improves the ability of the coupling to prevent arcing in lighting strike conditions. It is also preferred that flanges 114 be coated with a boron nickel coating in the areas where electrical contact with the bonding springs is needed.

Figures 6, 7, 8:
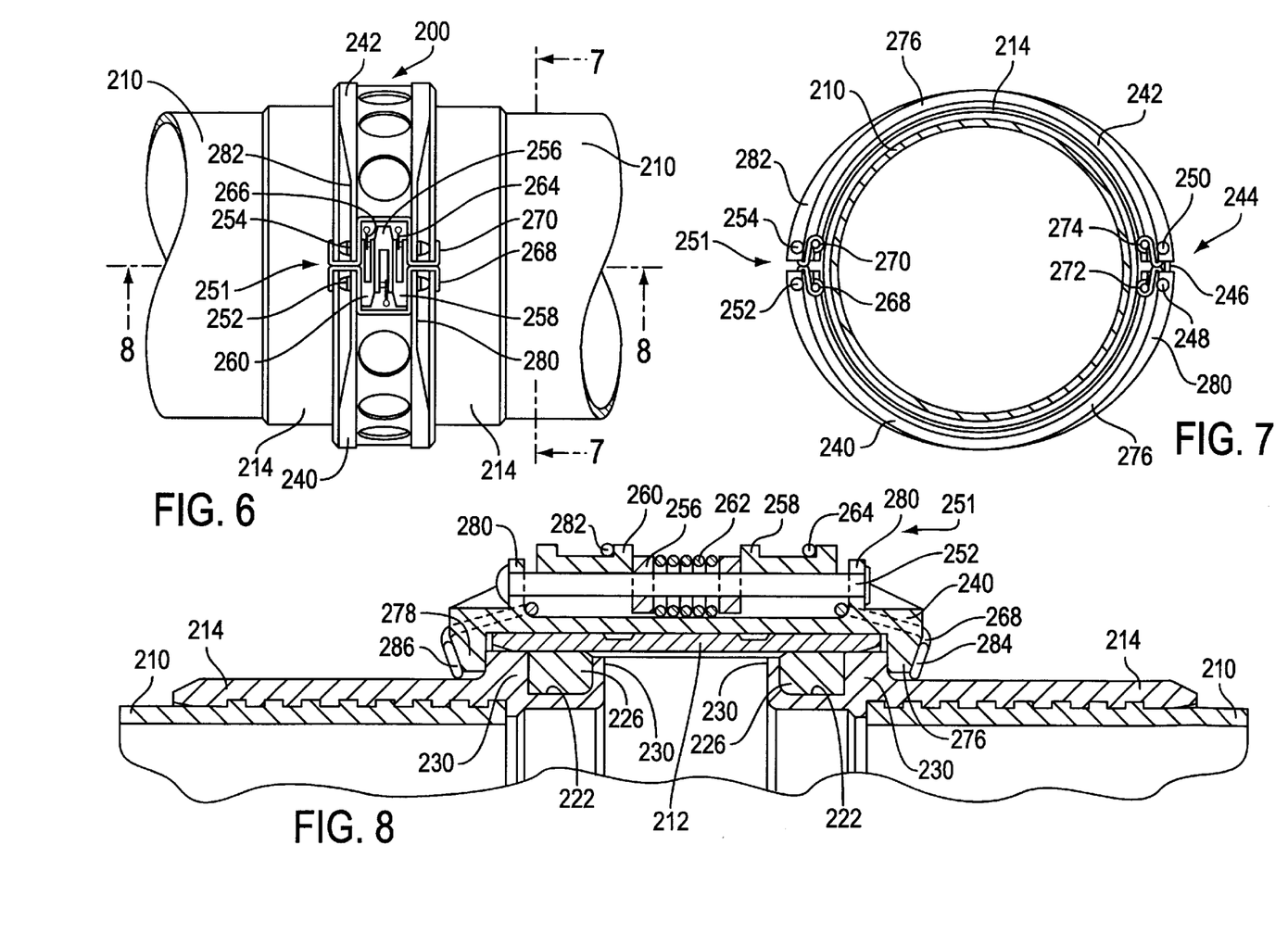
FIG. 6 is a side view of an alternative embodiment of the fuel coupling of the invention.
FIG. 7 is a cross-sectional view taken along Section 7—7 of FIG. 6.
FIG. 8 is a cross-sectional view taken along Section 8—8 of FIG. 7.

An alternative coupling in accordance with the invention, which is a clamshell type coupling, is shown in FIGS. 6–8, and is generally similar to the coupling disclosed in commonly owned U.S. Pat. No. 4,249,786, the content of which is incorporated herein by reference. Coupling 200 is adapted to connect first and second conduits 210 and to removably circumferentially engage a sleeve 212, which is preferably constructed of a metallic material. An assembly sealing flange 214 is sealingly attached to the end of each conduit 210 by any method known to those skilled in the art, provided that each flange 214 is in electrical communication with the electrically conductive portion of its associated conduit. Each flange 214 is provided with a peripheral recess 222 formed between a pair of peripheral ribs 230. An O-ring 226 is seated in each peripheral recess 222, and sleeve 212 peripherally surrounds and seats against each O-ring, forming a fluid tight seal between each flange 214 and sleeve 212, permitting translational, rotational and angular adjustment of the first and second conduits 210 with respect to each other.

Coupler 200 comprises a generally circular member having two complementary semicircular segments 240, 242. Each of the semicircular segments 240, 242 arcuately extends substantially 180 degrees around sleeve 212 and seats against the outer periphery of sleeve 212. When the semicircular segments 240 and 242 are in a closed position, they retain the conduit ends and the sleeve 212 in a cooperative sealing relationship.

A hinge assembly 244 pivotally joins semicircular segments 240, 242, allowing them to be circumferentially spread apart to assemble and disassemble the coupler 200 and sleeve 212. Hinge assembly 244 may comprise any conventional hinge mechanism known in the art. For example, as shown in FIGS. 6–8, hinge assembly may include a single hinge plate 246 pivotally joined to semicircular segment 240 by hinge pin 248, and pivotally joined to semicircular segment 242 by hinge pin 250. Alternatively, as shown in U.S. Pat. No. 4,346,428, the hinge assembly may include a pin pivotally connecting two hinge leaves mounted to each semicircular segment. The hinge assembly may also include a spring mechanism for biasing the semicircular segments to an open configuration.

Latch assembly 251 retains the coupling 200 in the closed configuration. Latch assembly 251 includes a first latch pin 252 mounted on the first semicircular segment 240 and a second latch pin 254 mounted on the second semicircular segment 242. A first latch pawl 256 is pivotally mounted on first latch pin 252. A second latch pawl 258 is pivotally mounted on second latch pin 254, and a third latch pawl 260 is pivotally mounted on second latch pin 54. Thus latch pins 252 and 254 each serve the dual function of pivotally supporting at least one latch pawl while cooperating with at least one other latch pawl to retain the coupling 200 in the closed configuration. Latch pins 252 and 254 are mounted on adjacent ends of semicircular segments to form an interlocking latch mechanism. First latch pawl 256 is biased toward engagement with second pin 254 by first latch spring 262. Likewise, second latch pawl 258 and third latch pawl 260 are biased toward engagement with first latch pin 252 by the urging of second and third latch springs 264 and 266 respectively.

It will be appreciated that latch assembly 251 may comprise any conventional latching assembly known in the art. For example, the latch assembly could include a single clevis mounted to one of the semicircular segments that engages with a clasp, as disclosed in U.S. Pat. No. 4,346,428. Thus, the present invention is not limited to any particular latch assembly, and the hard metallic ductile coating of the invention may be employed on a coupling having virtually any type of latching assembly.

Electrical bonding is provided between the conduits 210 through the coupling 200 by means of bonding springs 268, 270, 272 and 274. Semicircular segments 240 and 242 are provided with inwardly extending radial shoulders 276 and 278 which cooperate with the outer peripheral ribs 230 on each of the flanges 214 to confine the flexible coupling together in operative configuration. Radial ribs 280 and 282 extend outwardly and serve to mount the respective hinge and latch pins as well as to shield the hinge assembly 244 and latch assembly 251 from accidental damage.

The bonding springs 268, 270, 272 and 274 are configured so that ends of the springs project outwardly beyond the radial shoulders 276 and 278. As shown in FIG. 8, spring ends 284 and 286 extend downwardly beyond radial shoulders 276 and 278 and engage firmly with the flanges 214 when the coupler is in the closed configuration. The bonding springs are held in position by the respective hinge and latch pins. Other bonding spring configurations and mounting techniques may also be utilized.

In order to ensure electrical continuity between semicircular segments 240, 242 and flanges 214, semicircular segments 240, 242, sleeve 212, flanges 214, and bonding springs 268, 270, 272 and 274 are coated with a boron electroless nickel ("boron nickel") coating. In a preferred embodiment, the boron nickel is coated to a thickness of 0.0003"+/−0.0001". It is foreseen that the thickness of the boron nickel coating may vary as desired, provided that the dimensions of the coupling will operate in the normal manner. Furthermore, it is preferred that all of the metal parts of the coupling be coated with a boron nickel coating, which improves the ability of the coupling to prevent arcing in lighting strike conditions. Nonetheless, it will be appreciated that any portion of the electrical path formed between the conduits may be coated with the boron nickel coating, if desired.

Boron nickel coating is known to those skilled in the coating field and is defined in AMS 2433-A. Such coating is commercially available by Anodyne™, Inc., 2230 S. Susan Street, Santa Ana, Calif. 92704. The characteristics of boron nickel coatings are described in "Engineering Bulletin—Boron Electroless Nickel vs. Hard Chrome", Anodyne™, Inc., May 1992, the content of which is incorporated herein by reference. In general, boron nickel is a metallic coating consisting of uniformly deposited hard nodules interlaced in a soft matrix. Both the nodules and matrix are metallic, although the composition of each is different. The nodules lend hardness to the coating and provide low friction and ductility to the surface of the coating. The matrix "fills in" between the nodules and is ductile.

The boron nickel coating is applied through an electroless immersion process in which the parts to be coated are submerged in an alkaline bath that operates at approximately 195° F. at about 12 pH. A chemical reaction causes a continuous uniform coating to be deposited on all unmasked areas of the parts. The parts may be masked so that the coating will only be deposited where necessary. Immersion time determines the amount of coating deposited on the parts. The thickness of the coating may typically vary from 0.0002" to 0.010", although the invention is not limited to a particular coating thickness.

Boron nickel forms an extremely hard coating, with a Knoop hardness of 800 to 900. After heat treating, this hardness may be increased to 1235 to 1245 on the Knoop scale, which converts to approximately 70 to 72 on the Rockwell C Scale. The nodules of the coating have a very strong bond to the substrate, passing ASTM C633. The nodules are bonded to each other through the soft matrix so that when the substrate flexes, the matrix flexes between the nodules. The flexing of the matrix allows the nodules to stay bonded to the coated part and allows the boron nickel coating to be extremely ductile.

The boron nickel coating passes the ASTM B117 accelerated salt spray test for corrosion resistance and also has a very low co-efficient of friction. A part riding against a boron nickel surface will ride on the top of the nodules of the coating. The actual area of contact between two surfaces is less than one half of that for non-coated parts. Boron nickel also has excellent adhesion characteristics and may continually operate at temperatures up to 900° F. and more.

From the foregoing, the advantages of the invention are readily apparent. Through the use of a boron nickel coating on the threads of the threaded coupling, an electrical path is provided between the coupling members without the necessity of a metallic detent spring with multiple detents. In general, the boron nickel coating provides improved electrical conductivity in all types of metallic couplings, which improves the ability of the coupling to prevent arcing and buildup of static electricity, and which improves the ability of the coupling to withstand lighting strikes.

Figure 9:
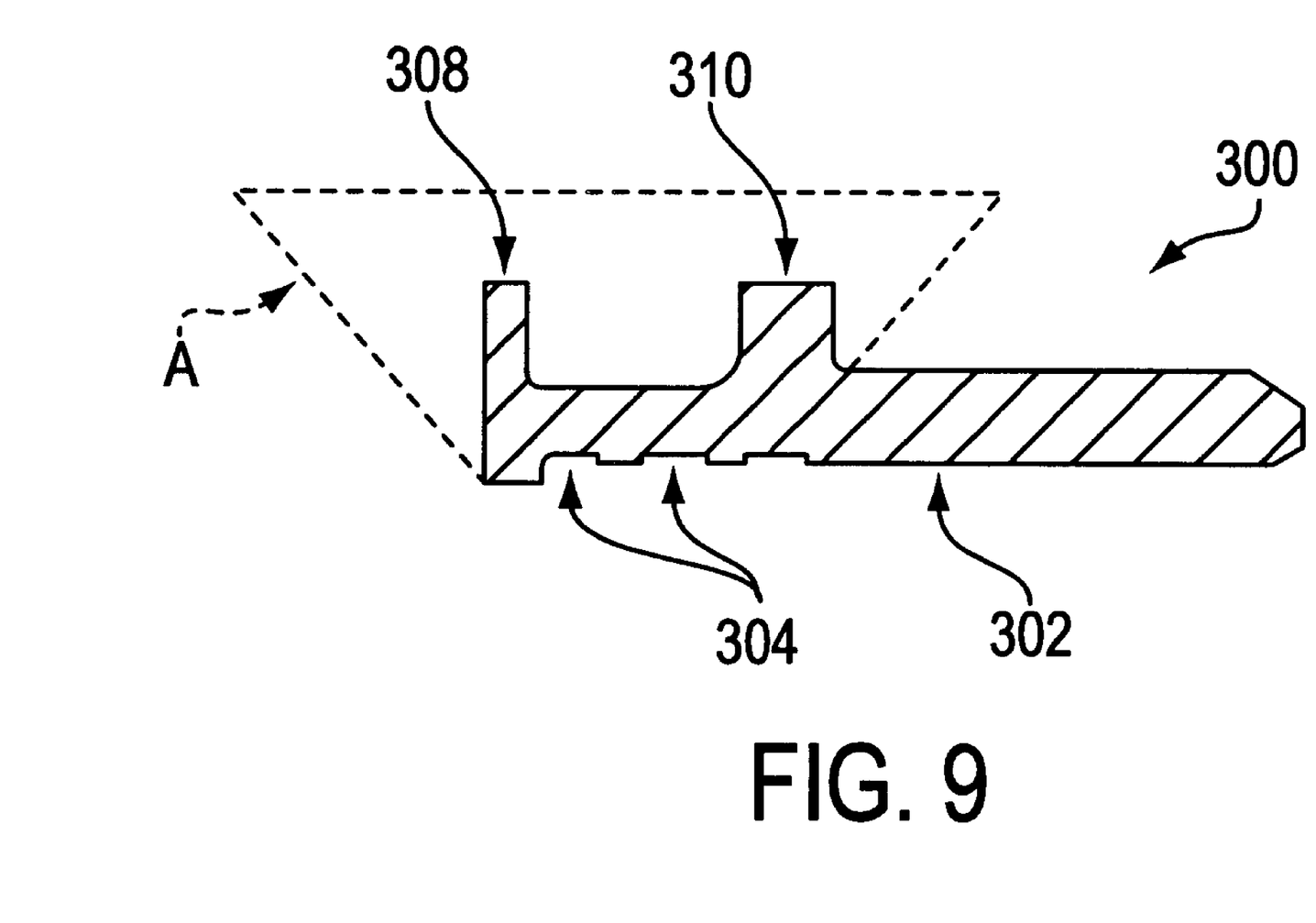
FIG. 9 is a cross-sectional view of a flange in accordance with the invention in which the flange is selectively coated with an anodized coating or a coating of a non-conductive material to prevent internal arcing when subject to a lighting strike.

In order to further improve the lighting strike and electrical conduction characteristics of the couplings described above, the couplings are preferably used in combination with flanges of the type shown in FIG. 9, which is generally similar to the flanges hereinbefore described. Flange 300 includes a cylindrical skirt 302 having a plurality of internally facing annular recesses 304. Flange 300 is preferably swaged to the fuel line or otherwise sealingly attached to the fuel lines by any suitable means. Flange 300 is provided with a peripheral recess formed between upstanding members 308 and 310 for receiving an O-ring (not shown). In order to prevent arcing on the portions of the flange/coupling nearest to the fuel, those portions of flange 300 denoted within dotted line "A" are coated with a hard anodized coating which is non-electrically conductive. In a preferred embodiment, the hard anodized coating is flash-coated with a 0.0003–0.0005" coating in accordance with MIL-A-8625 Type III. In an alternative embodiment, the coating may be any appropriate non-electrically conductive coating, such as a dry-lube coating, provided that the coating be of sufficient strength/thickness so as not to be removed during normal use from critical areas of the coupling. The remainder of the flange, i.e., that area not denoted "A", is preferably coated with a boron nickel coating of the type described above.

It will be appreciated that the function of the hard anodized coating is to prevent arcing within the coupling by increasing the electrical resistance between the ends of the flanges and between the flanges and the couplings in the area adjacent to the fuel. At the same time, the function of the boron nickel coating is to improve the conductivity between the fuel line and the flange and between the flange and the coupling through the bonding wire. Accordingly, the boron nickel coating and the hard anodized or other insulating coating may be selectively applied as desired so as to define a pathway of electrical conductivity away from the fuel in the fuel line. For example, it is important that the portions of the flange that the bonding wire is in contact with be coated with a boron nickel coating. Similarly, the areas of contact between the flange and fuel line are also preferably coated with boron nickel. Those portions of the flange interior to the O-ring, and especially the edges of the flanges that face each other, are most critical to receive an insulating coating since these areas are most likely to ignite fuel or fuel vapor in or around the coupling if arcing were to result during a lighting strike. The inner diameter of the coupling members may also be coated with an anodized or other insulating coating in the area denoted B in FIG. 3, as may the inner diameter of sleeve 212 shown in FIG. 8. This coating will further reduce the likelihood of internal arcing.

It will be appreciated that although the present invention has been described in detail with respect to particular types of couplings that are useful for airplane fuel couplings in which the avoidance of static electricity is critical, it is applicable to any type of coupling in which the portions of the coupling that are in contact may be coated with a boron nickel coating to provide improved electrical conductivity therebetween. For example, many different types of couplings are known, e.g., threaded couplings, quick disconnect couplings, etc., that could be constructed of boron nickel coated parts so as to provide electrical conductivity. Moreover, the selective application of boron nickel and hard anodized or other insulating coatings may have applications in other fields in which it is desirable to reduce arcing under lighting strike or other electrical conditions in which such arcing might occur. More generally, although the present invention has been described in detail with respect to certain embodiments and examples, variations and modifications exist that are within the scope of the present invention as defined in the following claims.

What is claimed is:

1. An improved coupling for coupling the confronting ends of first and second conduits carrying a flammable material, the first and second conduits each terminating in a flange, the coupling comprising an electrical connection path between the first and second conduits through the flanges, the improvement comprising:

each flange comprising a first portion exposed to the flammable material and in close proximity to the other flange or an interior of the coupling; and at least the first portion of each flange being coated with an insulating coating for reducing arcing between ends of the flanges and between the flanges and the coupling.

2. The coupling according to claim 1 wherein the insulating coating is an anodized coating, a dry-lube coating, or a thin-film non-conductive coating.

3. The improved coupling according to claim 1 wherein each flange comprises a second portion in the electrical connection path and at least the second portion of the flanges and those portions of the coupling in the electrical connection path between the first and second conduits are coated with a hard metallic ductile conductive coating.

4. The coupling according to claim 3 wherein the hard metallic ductile conductive coating is a boron-nickel coating.

5. A coupling for carrying a flammable material and for providing electrical contact between confronting ends of first and second conduits, the coupling comprising:

an end of each of the first and second conduits comprising a flange, each flange comprising a first portion exposed to an interior conduit carrying a flammable material and in close proximity to the other flange or an interior of the coupling;

a circumferential member removably circumferentially engaging the flanges and establishing an electrical connection path between the first and second conduits through a second portion of the flanges; and the first portion of each flange being coated with an insulating coating for reducing arcing and ignition of the flammable material.

6. The coupling according to claim 4 wherein the circumferential member comprises first and second pivotally joined semicircular segments.

7. The coupling according to claim 6 further comprising a latch assembly for retaining the coupling in a closed position.

8. The coupling according to claim 7 wherein the latch assembly comprises a first latch pin mounted to the first semicircular segment; a second latch pin mounted to the second semicircular segment; a first latch pawl pivotally mounted to the first latch pin, the first latch pawl being engageable with the second latch pin; and a second latch pawl pivotally mounted to the second latch pin, the second latch pawl being engageable with the first latch pin.

9. The coupling according to claim 8 wherein the latch pawls are spring biased toward engagement with the latch pins.

10. The coupling according to claim 7 wherein the latch assembly comprises a clevis mounted to the first semicircular segment and a clasp mounted to the second semicircular segment, the clasp being engageable with the clevis.

11. The coupling according to claim 6 further comprising bonding wires extending between the semicircular segments and the flanges for establishing an electrical bond therebetween, the bonding wires being in the electrical connection path.

12. The coupling according to claim 11 wherein the semicircular segments or the bonding wires are coated with a boron nickel coating.

13. The coupling according to claim 11 wherein the bonding wires are in electrical contact with the flanges, the flanges being coated with a boron nickel coating on the portion thereof contacting the bonding wires.

14. The coupling according to claim 5 wherein the insulating coating is selected from the group consisting of an anodized coating, a dry-lube coating, and a thin-film non-conductive coating.

15. The coupling according to claim 5 wherein each flange comprises a portion facing the other flange, and wherein the facing portions are coated with the insulating coating.

16. The coupling according to claim 5 wherein the second portion of each flange and the portion of the circumferential member in the electrical connection path are coated with a hard metallic ductile conductive coating for providing electrical contact between the first and second conduits through the circumferential member and the second portions of the flanges.

17. The coupling according to claim 16 wherein the hard metallic ductile conductive coating is a boron-nickel coating.

18. A coupling for carrying a flammable material and for providing electrical contact between the confronting ends of first and second conduits, the coupling comprising:

each of the first and second conduits comprising a flange in electrical contact with the confronting end thereof, each flange comprising a first portion exposed to an interior conduit carrying the flammable material and in close proximity to the other flange or an interior conduit of the coupling;

a pair of pivotally joined semicircular segments;

one or more bonding springs mounted to at least one of the semicircular segments, one portion of each bonding spring contacting one of the flanges for providing an electrical connection path between the conduits via the semicircular segments and through a second portion of each flange, at least the second portion of each flange and that portion of the semicircular segments in the electrical connection path being coated with a hard metallic ductile conductive coating; and at least the first portion of the flanges being coated with an insulating coating for reducing arcing between the flanges and between the flanges and the semicircular segments.

19. The coupling according to claim 18 wherein the hard metallic ductile conductive coating is a boron-nickel coating.

20. The coupling according to claim 18 wherein the bonding springs are coated with a boron nickel coating.

21. The coupling according to claim 18 wherein each semicircular segment is coated with a boron nickel coating.

22. The coupling according to claim 18 wherein each of the flanges is selectively coated with an insulating coating on the portions thereof exposed to the interior conduit of the coupling.

23. The coupling according to claim 18 wherein the insulting coating is selected from the group consisting of an anodized coating, a dry-lube coating, and a thin-film non-conductive coating.

24. A coupling for carrying a flammable material and for providing electrical contact between first and second conduits, the coupling comprising:

first and second flanges on the ends of the first and second conduits respectively;

a first coupling member in electrical contact with the first flange;

a second coupling member in electrical contact with the second flange, the first and second coupling members being attachable in physical contact with each other for establishing a passage conduit between the first and second flanges and for establishing an electrical connection path between the first and second conduits through the first and second coupling members and a first portion of each of the first and second flanges; and at least a second portion of each of the first and second flanges exposed to the passage conduit and in close proximity to the other flange or the first or second coupling members being coated with an insulating coating for reducing arcing between the flanges and between the flanges and the coupling members.

25. The coupling according to claim 24 wherein at least a portion of the areas of the first and second coupling members that are in physical contact and the first portion of the first and second flanges are coated with a hard metallic ductile conductive coating for establishing electrical contact between the first and second coupling members and between the first and second coupling members and the first and second flanges.

26. The coupling according to claim 25 wherein the hard metallic ductile conductive coating is a boron-nickel coating and wherein the first and second coupling members each comprise threads, the first coupling member being threadably engageable with the second coupling member, the threads being coated with the boron-nickel coating.

27. The coupling according to claim 24 wherein the insulating coating is an anodized coating, a dry-lube coating, or a thin-film non-conductive coating.

28. The coupling according to claim 24 wherein the first coupling member comprises a first surface facing the second coupling member, the first surface comprising at least one detent notch, the coupling further comprising a detent spring rotatable with and in fixed relation to the second coupling member and facing the first surface, the detent spring comprising a detent, wherein the detent engages in the at least one notch to provide a resistance force against relative rotation between the first and second coupling members as the coupling members threadably engage.

29. The coupling according to claim 24 wherein the first and second coupling members are coated with an insulating coating on a portion thereof exposed to the passage conduit.

30. The coupling according to claim 29 wherein the insulating coating is an anodized coating, a dry-lube coating, or a thin-film non-conductive coating.

31. The coupling according the claim 24 wherein the first and second coupling members comprise first and second inwardly facing circumferential retaining grooves respectively, the coupling further comprising first and second split rings mounted in the first and second retaining grooves respectively, each split ring being in electrical contact with its respective coupling member, each split ring comprising an internal groove, and first and second bonding wires mounted within the internal grooves of the first and second retaining rings respectively, each bonding wire being in electrical contact therewith and with its respective flange, each flange comprising a boron nickel coating on the portion thereof in contact with the bonding wires.

32. The coupling according the claim 24 wherein the first and second coupling members comprise first and second inwardly facing circumferential retaining grooves respectively, the coupling further comprising first and second bonding wires mounted in the first and second retaining grooves respectively, each bonding wire being in electrical contact with its respective coupling member and with its respective flange, each flange comprising a boron nickel coating on the portion thereof in contact with the bonding wires.

* * * * *